July 3, 1945.  B. KREUZER  2,379,489
COMBINATION SOUND RECORDER AND MOTION PICTURE CAMERA
Filed Feb. 11, 1943  2 Sheets-Sheet 1
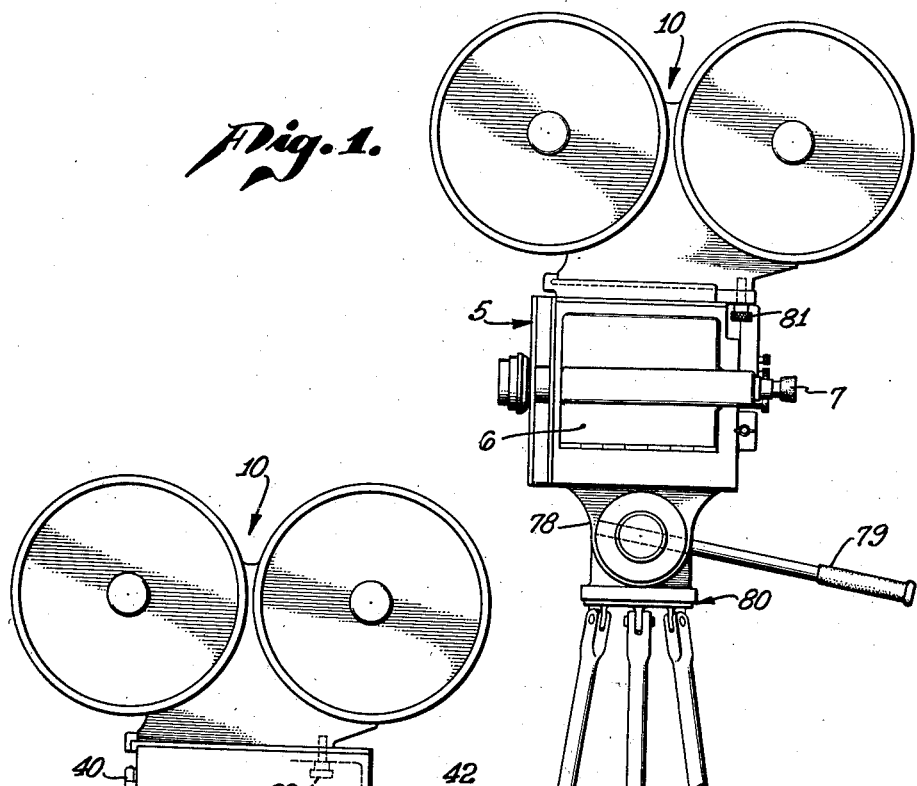
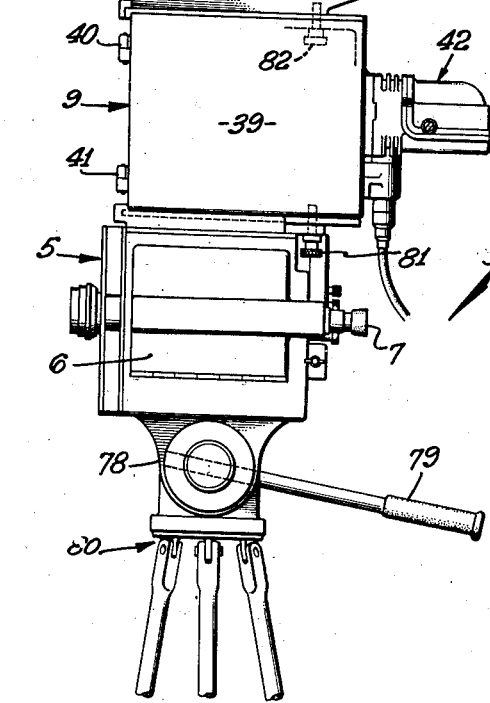
BARTON KREUZER,
INVENTOR.
BY *Orl R. Gorham*
ATTORNEY.

July 3, 1945. B. KREUZER 2,379,489
COMBINATION SOUND RECORDER AND MOTION PICTURE CAMERA
Filed Feb. 11, 1943 2 Sheets-Sheet 2

BARTON KREUZER,
INVENTOR.

BY Carl R. Goshaw
ATTORNEY.

Patented July 3, 1945

2,379,489

UNITED STATES PATENT OFFICE 2,379,489

COMBINATION SOUND RECORDER AND MOTION-PICTURE CAMERA

Barton Kreuzer, Los Angeles, Calif., assignor to Radio Corporation of America, a corporation of Delaware Application February 11, 1943, Serial No. 475,579

21 Claims. (Cl. 88—16.2)

This invention relates to motion picture sound recording apparatus and particularly to a sound recording adjunct of a standard or special type of motion picture camera.

Sound recorders of various types are well known in the art. The majority are separate and distinct units placed or positioned at points separate from the camera, such as in mobile automobile trucks or in a sound recording building. The sound is recorded on these units simultaneously with the photographing of the picture by motion picture cameras situated on the sets at a distance from the sound recording unit. Combination camera and sound recording units are also known in the art, such systems being employed by newsreel reporters, the feature of the combination unit being its small size and portability.

In the equipment now in use wherein an attachment for sound recording is mounted on a camera, provision has been made in all cases for establishing a geared connection between the motor or a gear which drives the camera, and a sprocket in the sound recording attachment. This necessitates making alterations in the camera to make the motor shaft or one of the gears accessible, and positioning the recording attachment with extreme nicety in order that one of its gears may properly register and mesh with one of the camera driving gears.

The present invention is directed to a sound recording unit which is adapted to be mounted on a camera in the same manner as a film magazine, the film magazine being mounted on top or above the sound recording unit, and power being supplied to the recording device through the film itself. By this arrangement the motion picture camera may be used in its normal manner, the film magazine taken on and off of the camera in the normal way, and no modifications made in the camera mechanism. When it is desired to record sound simultaneously with the photographing of a scene, it is only necessary to mount the sound recording unit in the magazine position and then mount the magazine above the sound recording unit in the same manner as the magazine is mounted on the camera. The recorder has been designed so that it is unnecessary to use adapters, to change gears or change the film driving mechanism of the camera in any way, the film simply being threaded through the sound recording unit and camera, the camera drive sprocket advancing the film in its usual manner.

Adequate power for driving whatever mechanism may be required in the recording attachment can be transmitted through the film as it is pulled down from the magazine by the camera sprocket. For example, if between the supply magazine and the camera sprocket the film passes an additional sprocket, it will rotate this sprocket, which can in turn supply power for operating other necessary mechanism. The novel film path between the supply and take-up reels provides a particularly steady and uniform motion of the film past the sound recording translation point. The invention thus provides a flexible and portable system wherein pictures may be photographed with or without sound. With an appropriate drive, the recorder unit may be used independently of the camera.

The principal object of the invention, therefore, is to improve a single unit motion picture camera and sound recorder.

Another object of the invention is to facilitate the photographing of a scene and the recording of its concomitant sound.

A further object of the invention is to provide a motion picture camera with a sound recording unit which may be rapidly attached and detached from the motion picture camera.

A further object of the invention is to provide a combination motion picture camera and sound unit in which the sound unit may be attached or detached from the camera without modification of the film drive system of the camera.

Another object of the invention is to provide a sound recording unit attachable and detachable from a motion picture camera between the camera and film magazine, the camera advancing the film through the sound recording unit at a uniform speed.

Although the novel features which are believed to be characteristic of this invention are pointed out with particularity in the claims appended herewith, the manner of its organization and the mode of its operation will be better understood by referring to the following description, read in conjunction with the accompanying drawings, in which:

Fig. 1 is an elevational view of a standard type of camera and film magazine.

Fig. 2 is an elevational view of the camera and film magazine of Fig. 1, to which the sound recorder adjunct has been attached.

Figure 3:
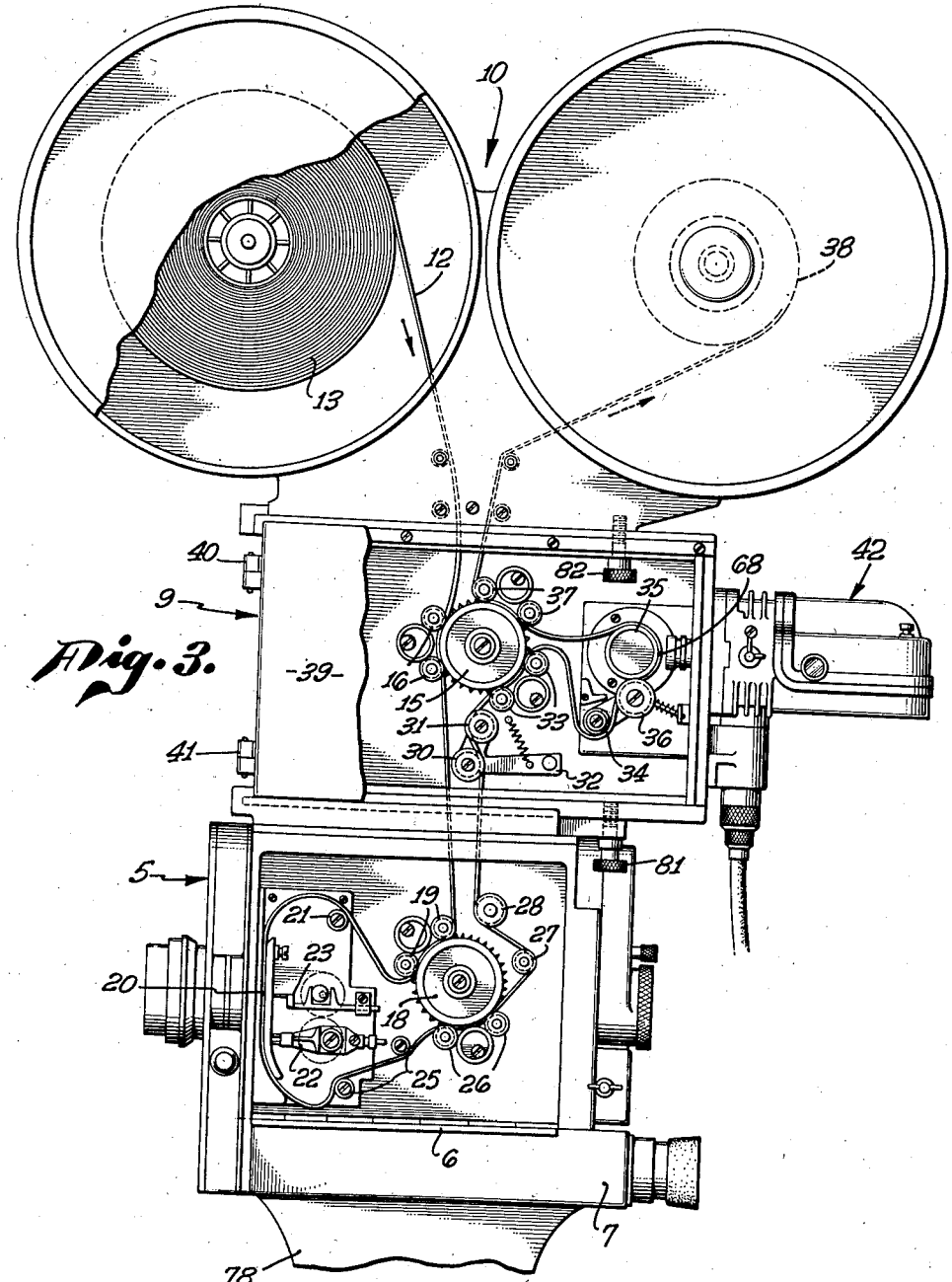
Fig. 3 is an elevational view of the camera, recorder and magazine combination showing the film path therethrough.

Referring first to Fig. 1, a standard type of camera 5 is shown mounted on a freehead 78 having a handle 79, the freehead being mounted on a tripod 80 of which only the upper portion is shown. Above the camera a standard film magazine 10 is attached and held in position by a thumb screw 81. This is the usual commercial motion picture camera and magazine arrangement wherein the film passes from a supply reel in the magazine 10 down through a light trap into the camera 5 and back through the light trap to a take-up reel, the film being advanced by a sprocket in the camera. The camera is provided with a door 6 on which is mounted the usual view finder 7.

Fig. 2 shows the camera 5 and magazine 10 when a recording unit 9 is attached or added to the standard camera and magazine system in accordance with the invention, the recording unit 9 having an optical unit 42 at one end thereof for modulating light in accordance with sound waves being recorded. The recording unit 9 has a door 39 mounted on hinges 40 and 41, to provide access to the interior of the recording unit. The thumb screw 81 is now used to fasten the recorder unit 9 to the camera 5 instead of to the magazine 10, while a second thumb screw 82 is employed to fasten the magazine 10 to the recorder unit 9. This is accomplished by constructing the bottom of recorder unit 9, the same as the bottom of magazine 10 and the top of recorder 9, the same as the top of camera 5. Thus, the physical attachment and detachment of the recorder adjunct to the standard motion picture camera and magazine may be rapidly made, the combination being thus easily adaptable to photographing pictures with or without sound. Although one standard type of motion picture camera has been illustrated, it is to be understood that other cameras could be modified to insert the recorder between the camera and magazine. Also, a special camera could be designed for this purpose.

Not only can the recorder unit be physically attached to and detached from the camera with facility, but a film path has been provided wherein the camera sprocket advances the film, not only through the camera itself but also through the sound recorder. This arrangement eliminates the necessity of making any alterations in the camera drive system or of meshing gears in order to provide power to the recording unit. To illustrate one such type of film drive in accordance with my invention, reference is made to Fig. 3 wherein the camera 5 is shown with its door 6 open. Mounted above the camera 5 is the sound recording unit 9 above which is mounted the film magazine 10. The path of a film 12 is shown leaving a supply reel 13 and passing between the left-hand side of a free sprocket 15 and pad rollers 16. The film then passes to a drive sprocket 18, passing under pad rollers 19 to the picture-taking aperture 20 over a guide roller 21, the film being moved past the aperture intermittently by a pull-down mechanism 22 in cooperation with a pilot pin mechanism 23. After passing the picture-taking aperture 20, the film is guided by rollers 25 to drive sprocket 18 under pad rollers 26 after which it passes around guide rollers 27 and 28 to belt tightener rollers 30 and 31 mounted on a bell crank lever 32 having a friction brake or drag at the free end thereof. The film then passes between free sprocket 15 and pad rollers 33, then around a guide roller 34, then under a pressure roller 36, around a recording drum roller 35, where it is exposed to sound light from the unit 42 as it passes the recording point 68. From the drum 35 the film again passes over free sprocket 15 between pad rollers 37 before going to a take-up reel 38. The camera 5 is driven in any normal or suitable manner such as by a synchronous or interlock motor geared to the shaft of sprocket 18, the sprocket 18 thus being rotated at a uniform speed while the pull-down and pilot pin mechanisms 22 and 23 intermittently advance the film past the picture-taking aperture 20.

The sprocket 18 pulls the film from the supply reel 13 and in doing so rotates or drives the free sprocket 15. Rotation of the sprocket 15 pulls the film over the recording roller 35, which could be a sprocket with one or two rows of teeth or a film gate, and feeds it to this roller from under pad rollers 33 as it is returned from the drive sprocket 18 around film tightener rollers 30 and 31. The film is threaded in such a manner so that both film loops or paths between the rollers 15 and 18 are taut, the belt tightener 30—31 being provided to insure the desired tautness. The pressure roller 36 bears upon the outside edges of the film so as to guide and obtain the necessary film wrap around roller 35 and friction between the film and roller. The roller 35 may be provided with a solid or viscous coupled flywheel on its shaft, the viscous type of stabilizing unit being known as a rotary stabilizer as shown in detail in detail in Reynolds Patent 2,013,109 of September 3, 1935.

The optical unit 42 shown on the right-hand end of recorder 9 contains a light source, lenses and a galvanometer modulator which varies the light beam impressed on the film, in accordance with the instantaneous variations of the sound waves being recorded. Any similar type of an optical unit suitable for attachment at this point may also be used. The details of operation of the above film drive and particularly the belt tightener 30—31 are well known to those skilled in the art. This particular method of and means for obtaining two taut film passes between the drive sprocket 18 and driven sprocket 15, provides a particularly stable and uniform film motion at the sound translation point, and also prevents variations in film tension as the film leaves the supply reel and is taken up by the take-up reel from being transmitted to the translation point. This type of drive not only avoids additional gears which always have at least some back-lash but provides a drive system which does not necessitate changing or varying the camera drive arrangement. The provision of the two taut film passes has the overall effect of gearing sprocket 18 and 15 together with no back-lash in the gearing.

The invention as above described, therefore, provides a sound recording adjunct for a standard or special type of motion picture camera which may be easily and quickly attached and detached from the camera and its film magazine without necessitating any modification of the camera itself, and which provides very satisfactory film motion with a particularly low percentage of flutter. The take-up reel 38 may be driven directly from the shaft of sprocket 18 or through an intermediate shaft on the sound recorder unit so that the regular camera take-up belt for the magazine can be used to drive the intermediate shaft.

When the recorder unit is used independently of the camera, a sprocket corresponding to the camera sprocket may be used to drive the film or the recorder sprocket 15 may be directly driven.

I claim as my invention:

1. A motion picture camera and sound recording combination comprising a motion picture camera having a drive sprocket and intermittent film-advancing mechanism, a sound recording unit mounted on said camera having a film driven sprocket and a film driven drum therein, and a film magazine mounted on said sound recording unit, said camera sprocket being adapted to advance said film from said magazine through said recording unit in contact with said recording unit sprocket, through said camera, through said recording unit in contact with said recording unit sprocket, around said drum to said recording unit sprocket and back to said magazine.

2. A combination in accordance with claim 1, in which said magazine is mountable on said camera in the position of said recording unit when said recording unit is not in use.

3. A motion picture camera and sound recorder combination comprising a camera having a film-advancing sprocket therein, a sound recording unit having a sprocket and sound recording drum therein, said last-mentioned sprocket and drum being adapted to be rotated by film pulled by said camera film advancing sprocket, a film magazine adapted to supply said film to said film-pulled sprocket and take-up film therefrom, said sound recording drum supporting said film at a light impression point, and means for guiding film from said film-pulled sprocket around said drum and to said film-pulled sprocket.

4. A combination in accordance with claim 3 in which means are provided intermediate said sprockets and contacting said film for eliminating film reel speed variations from affecting the film on said film supporting means.

5. A sound recording unit adapted to be attached to a motion picture camera between the camera and film magazine, said camera having a sprocket therein and said unit having a sprocket and recording drum therein adapted to be rotated by the film pulled through said unit by said camera sprocket, means for guiding film from said magazine to said recorder sprocket, then to said camera sprocket, then to said recorder sprocket, then around said drum to said recorder sprocket, and then to said magazine, and an optical system on said unit for light-impressing said film.

6. A combination comprising a motion picture camera, a magazine therefor adapted to be attached to said camera for supplying film to said camera for photographing pictures on said film, a sound recording unit mounted intermediate said camera and magazine, a film advancing means in said camera, a sprocket in said recorder adapted to be rotated by the film advanced by said camera film advancing means, and a film roller in said recorder over which film is pulled by said recorder sprocket as said film passes from said camera to said magazine, said film contacting said recorder sprocket before and after passing to and from said film roller.

7. A motion picture camera and sound recording combination comprising a standard motion picture mechanism having a drive sprocket and intermittent film advancing mechanism, a sound recording unit mounted on said camera having a film-driven sprocket and a film magazine mounted on said sound recording unit, said camera sprocket being adapted to advance said film from said magazine through said recording unit over said driven sprocket, through said camera, through said recording unit over said sprocket and to said magazine, said film being taut and rigid between said sprockets.

8. A combination in accordance with claim 7, in which said magazine is mountable on said camera in the position of said recording unit when said recording unit is not used.

9. A combination in accordance with claim 7 in which the film forms two taut and rigid paths between said driving sprocket and said film-driven sprocket.

10. A combination in accordance with claim 7 in which a recording drum is provided in said recording unit, said film-pulled sprocket advancing said film over said drum.

11. A motion picture camera and sound recorder combination comprising a camera having a film-advancing sprocket therein, a sound recording unit having a sprocket therein, said last mentioned sprocket adapted to be rotated by film pulled by said camera advancing sprocket, a film magazine adapted to feed film to said film-pulled sprocket and take up film therefrom, a sound recording drum, and means for guiding film from said film-pulled sprocket around said drum and to said film-pulled sprocket, said film forming two taut and rigid passes between said sprockets.

12. A combination in accordance with claim 11 in which means are provided for maintaining the film taut between said two sprockets.

13. A sound recording unit adapted to be attached to a motion picture camera between the camera and film magazine, said camera having a sprocket therein and said unit comprising a sprocket adapted to be rotated by the film pulled through said unit by said camera sprocket, a sound recording drum, means for guiding film around said drum from and to said recording unit, the film forming two taut and rigid loops between said sprockets, and an optical element on said unit for light-impressing said film.

14. A sound recording unit adapted to be attached to a motion picture camera between the camera and film magazine, said camera having a sprocket therein and said unit comprising a sprocket adapted to be rotated by the film pulled through said unit by said camera sprocket, a sound recording drum, means for guiding film around said drum from and to said film driven sprocket, the film forming two taut loops between said sprockets, an optical element on said unit for light-impressing said film, said film contacting said recording unit sprocket in three positions, and a belt tightener for said film between said sprocket and said camera.

15. A combination comprising a camera having a drive sprocket, a sound recorder attached to said camera having a sprocket driven by film advanced by said drive sprocket, a film magazine attached to said recorder, the film contacting said recorder sprocket as it passes from said magazine to said camera and from said camera to said magazine and means for maintaining the film taut and rigid between said sprockets.

16. A combination in accordance with claim 15 in which means are provided for causing said film to contact said recorder sprocket twice as it passes from said camera to said magazine.

17. A combination in accordance with claim 15 in which a film-pulled drum is provided in said recorder, said film passing from said recorder sprocket to said drum and back to said sprocket.

18. A combination in accordance with claim 15 in which a film-pulled drum is provided in said recorder, a mechanical filter being provided for said drum as the film passes from said recorder sprocket to said drum and back to said sprocket.

19. A combination comprising a camera having a film advancing sprocket therein, a sound recorder attached to said camera and having a film-pulled sprocket therein, a film-pulled drum in said recorder, said film passing from said recorder sprocket to said camera sprocket, back to said recorder sprocket, to said drum and back to said recorder sprocket, and means for maintaining said film taut and rigid between said sprockets.

20. A combination comprising a camera having a film advancing sprocket therein, a sound recorder attached to said camera and having a film-pulled sprocket therein, a film-pulled drum in said recorder, said film passing from said recorder sprocket to said camera sprocket, back to said recorder sprocket, to said drum and back to said recorder sprocket, means for maintaining said film taut between said sprockets, said last mentioned means comprising a roller in one of said film passes between said sprockets, and a tensioning spring and friction brake for said roller.

21. A film drive mechanism comprising a drive sprocket, a film-driven sprocket, the film passing from said driven sprocket to said drive sprocket and back to said driven sprocket, and a tightening device for maintaining both film passes taut and rigid, said device comprising a roller in one of said film passes, a pivoted arm on which said roller is mounted, a tensioning spring for said arm and a friction brake for said arm.

BARTON KREUZER.